United States Patent
Kopec et al.

(10) Patent No.: US 7,721,067 B2
(45) Date of Patent: May 18, 2010

(54) TRANSLATION LOOKASIDE BUFFER MANIPULATION

(75) Inventors: Brian Joseph Kopec, Cary, NC (US); Victor Roberts Augsburg, Cary, NC (US); James Norris Dieffenderfer, Apex, NC (US); Jeffrey Todd Bridges, Raleigh, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 11/336,264

(22) Filed: Jan. 20, 2006

(65) Prior Publication Data

US 2007/0174584 A1 Jul. 26, 2007

(51) Int. Cl.
*G06F 9/34* (2006.01)

(52) U.S. Cl. .................. 711/205; 711/207; 711/204; 711/203; 711/202

(58) Field of Classification Search .................. 711/205, 711/207, 202, 203, 204
See application file for complete search history.

(56) References Cited

U.S. PATENT DOCUMENTS

| 6,076,153 A | 6/2000 | Grochowski et al. |
| 6,745,297 B2 * | 6/2004 | Kruckemyer et al. ....... 711/145 |
| 7,228,404 B1 * | 6/2007 | Patel et al. ................... 712/228 |

* cited by examiner

*Primary Examiner*—Manorama Padmanabhan
*Assistant Examiner*—Mardochee Chery
(74) *Attorney, Agent, or Firm*—Sam Talpalatsky; Nicholas J. Pauley; Peter M. Kamarchik

(57) ABSTRACT

A processor having a multistage pipeline includes a TLB and a TLB controller. In response to a TLB miss signal, the TLB controller initiates a TLB reload, requesting address translation information from either a memory or a higher-level TLB, and placing that information into the TLB. The processor flushes the instruction having the missing virtual address, and refetches the instruction, resulting in re-insertion of the instruction at an initial stage of the pipeline above the TLB access point. The initiation of the TLB reload, and the flush/refetch of the instruction, are performed substantially in parallel, and without immediately stalling the pipeline. The refetched instruction is held at a point in the pipeline above the TLB access point until the TLB reload is complete, so that the refetched instruction generates a "hit" in the TLB upon its next access.

22 Claims, 3 Drawing Sheets

TRANSLATION LOOKASIDE BUFFER MANIPULATION

FIELD

The present disclosure relates to translation lookaside buffers.

BACKGROUND

In a processor that supports paged virtual memory, data may be specified using virtual (or "logical") addresses that occupy a virtual address space of the processor. The virtual address space may typically be larger than the amount of actual physical memory in the system. The operating system in these processors may manage the physical memory in fixed size blocks called pages.

To translate virtual page addresses into physical page addresses, the processor may search page tables stored in the system memory, which may contain the address translation information. Since these searches (or "page table walks") may involve memory accesses, unless the page table data is in a data cache, these searches may be time-consuming.

The processor may therefore perform address translation using one or more translation lookaside buffers (TLBs). A TLB is an address translation cache, i.e. a small cache that stores recent mappings from virtual addresses to physical addresses. The processor may cache the physical address in the TLB, after performing the page table search and the address translation. A TLB may commonly contain often referenced virtual page addresses, as well as the physical page address associated therewith. There may be separate TLBs for instruction addresses (instructions-TLB or I-TLB) and for data addresses (data-TLB or D-TLB).

When a TLB receives a virtual page address, the TLB may search its entries to see if the address translation information contained in any of these entries match the received virtual page address. If the virtual page address presented to a TLB does match an address translation information in any of the TLB entries, a TLB "hit" may occur; otherwise, a TLB "miss" may occur.

In response to a TLB miss, the pipeline may be stalled at the point where the miss occurs. The instruction containing the virtual address may just sit and wait, unable to proceed to the next stage because of lack of the address translation information. While this happens, all stages above the point where the miss has occurred may also have to wait, resulting in considerable inefficiency. Another measure adopted in response to a TLB miss may be to flush the instruction that missed, without stalling the instruction at a stage prior to the TLB access point. In this case, multiple misses may occur for the same instruction, requiring multiple flushes. This may also result in inefficiency.

SUMMARY

A processor may have a multistage pipeline, and may include a TLB and a TLB controller. The TLB may be configured to store address translation information that allows virtual addresses to be translated into physical addresses. The TLB may be further configured to generate a TLB miss signal when a virtual address of an instruction presented to the TLB is missing from the TLB. The TLB controller may be further configured to initiate, in response to the TLB miss signal, a TLB reload. The processor may be configured to flush the instruction having the missing virtual address. The processor may be further configured to refetch the instruction, which results in a re-insertion of the instruction at an initial stage of the pipeline above a TLB access point. Both the initiation of the TLB reload and the flush/refetch of the instruction may be performed in parallel, without immediately stalling the pipeline. The processor may be further configured to hold the refetched instruction at a point in the pipeline above the TLB access point until the TLB reload is complete, so that the refetched instruction will then "hit" in the TLB upon its next access.

A method of operating a TLB in a pipelined processor having a multistage pipeline may include receiving a TLB miss signal from a TLB. The TLB miss signal may indicate an absence in the TLB of address translation information for a virtual address of an instruction. The method may further include initiating a TLB reload in response to the TLB miss signal. The method may further include flushing the instruction and refetching it, causing it to be re-inserted at an initial stage of the pipeline above the TLB access point, in response to the TLB miss signal. Both the initiation of the TLB reload and the flush/refetch of the instruction may be done in parallel, without immediately stalling the pipeline. The method may further include holding the refetched instruction at a point in the pipeline above the TLB access point until the TLB reload is complete, so that the refetched instruction will then "hit" in the TLB upon its next access.

DETAILED DESCRIPTION

The detailed description set forth below in connection with the appended drawings is intended to describe various illustrative embodiments of a processor and of a method of operating a TLB in a processor, but is not intended to represent the only embodiments in which the present inventive concepts disclosed herein may be practiced. The detailed description includes specific details, in order to permit a thorough understanding of what is described. It should be appreciated by those skilled in the art, however, that in some embodiments, one or more of these specific details may not be needed. In some instances, well-known structures and components are shown in block diagram form, in order to more clearly illustrate the concepts being presented.

Figure 1:
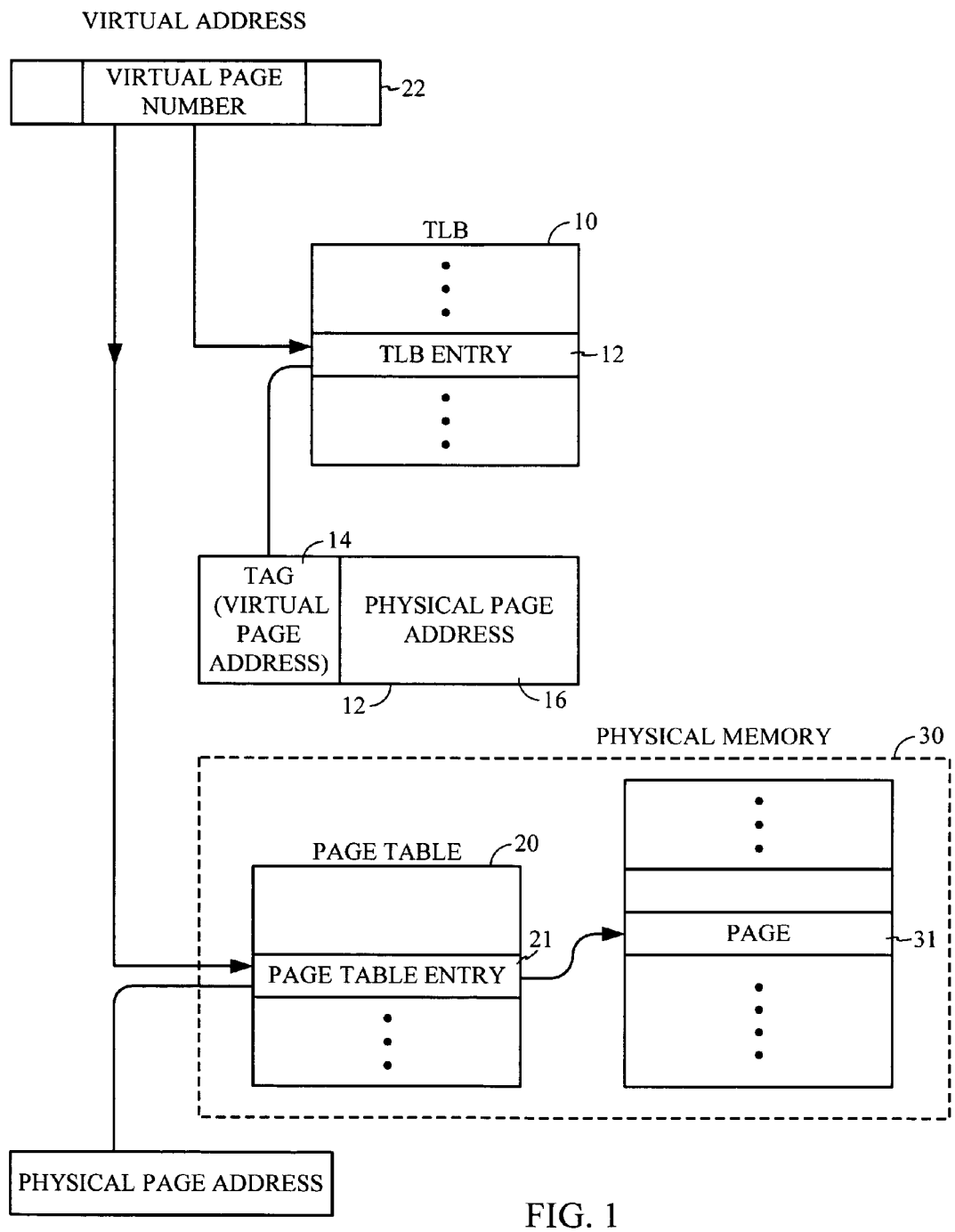
FIG. 1 schematically illustrates a TLB that operates in a virtual memory system.

FIG. 1 schematically illustrates a TLB that operates in a virtual memory system. In virtual memory systems mappings (or translations) may typically be performed between a virtual (or "linear") address space and a physical address space. A virtual address space typically refers to the set of all virtual addresses 22 generated by a processor. A physical address space typically refers to the set of all physical addresses for the data residing in the physical memory 30 of the processor, i.e. the addresses that are provided on a memory bus to write to or read from a particular location in the physical memory 30.

In a paged virtual memory system, it may be assumed that the data is composed of fixed-length units 31 commonly referred to as pages. The virtual address space and the physical address space may be divided into blocks of contiguous page addresses. Each virtual page address may provide a virtual page number, and each physical page address may indicate the location within the memory 30 of a particular page 31 of data. A typical page size may be about 4 kilobytes, for example, although different page sizes may also be used. The page table 20 in the physical memory 30 may contain the physical page addresses corresponding to all of the virtual page addresses of the virtual memory system, i.e. may contain the mappings between virtual page addresses and the corresponding physical page addresses for all the virtual page addresses in the virtual address space. Typically, the page table 20 may contain a plurality of page table entries (PTEs) 21, each PTE 21 pointing to a page 31 in the physical memory 30 that corresponds to a particular virtual address.

Accessing the PTEs 21 stored in the page table 20 in the physical memory 30 may generally require memory bus transactions, which may be costly in terms of processor cycle time and power consumption. The number of memory bus transactions may be reduced by accessing the TLB 10, rather than the physical memory 30. As explained earlier, the TLB 10 is an address translation cache that stores recent mappings between virtual and physical addresses. The TLB 10 typically contains a subset of the virtual-to-physical address mappings that are stored in the page table 20. In order to increase the efficiency of TLB accesses, multiple levels (not shown) of TLBs may be used and implemented, by analogy to multiple levels of memory cache, a lower level TLB typically being smaller and faster, compared to an upper level TLB. A TLB 10 may typically contain a plurality of TLB entries 12. Each TLB entry 12 may have a tag field 14 and a data field 16. The tag field 14 may include some of the high order bits of the virtual page addresses as a tag. The data field 16 may indicate the physical page address corresponding to the tagged virtual page address.

A paged virtual memory system, as described above, may be used in a pipelined processor having a multistage pipeline. Pipelining can increase the performance of a processor, by arranging the hardware so that more than one operation can be performed concurrently. In this way, the number of operations performed per unit time may be increased, even thought the amount of time needed to complete any given operation may remain the same. In a pipelined processor, the sequence of operations within the processor may be divided into multiple segments or stages, each stage carrying out a different part of an instruction or an operation, in parallel. The multiple stages may be viewed as being connected to form a pipe. Typically, each stage in a pipeline may be expected to complete its operation in one clock cycle. An intermediate storage buffer may commonly be used to hold the information that is being passed from one stage to the next.

When an instruction has a virtual address 22 that needs to be translated into a corresponding physical address, during execution of a program, the TLB 10 may be accessed in order to look up the virtual address 22 among the TLB entries 12 stored in the TLB 10. The virtual address 22 typically includes a virtual page number, which may be used in the TLB 10 to look up the corresponding physical page address. More specifically, each virtual address generated by a processor, whether for an instruction fetch or for an operand fetch/store operation, may be viewed as including a virtual page number (typically represented by the higher order bits of the virtual address) followed by an offset (typically represented by the lower order bits of the virtual address). The offset portion of the virtual address may specify the location of a particular byte or word within a page.

If the TLB 10 contains, among its TLB entries, the particular physical page address corresponding to the virtual page number contained in the virtual address 22 presented to the TLB, a TLB "hit" may occur, and the physical page address can be retrieved from the TLB 10. If the TLB 10 does not contain the particular physical page address corresponding to the virtual page number in the virtual address 22 presented to the TLB, a TLB "miss" may occur, and a lookup of the page table 20 in the physical memory 30 (and/or a lookup of higher-level TLBs, if any) may have to be performed. Once the physical page address is determined from the page table 20, the physical page address corresponding to the virtual page address may be loaded into the TLB 10, and the TLB 10 may be accessed once again with the virtual page address 22. Because the desired physical page address has now been loaded in the TLB 10, the TLB access may result in a TLB "hit" this time, and the recently loaded physical page address may be generated at an output of the TLB 10.

Figure 2:
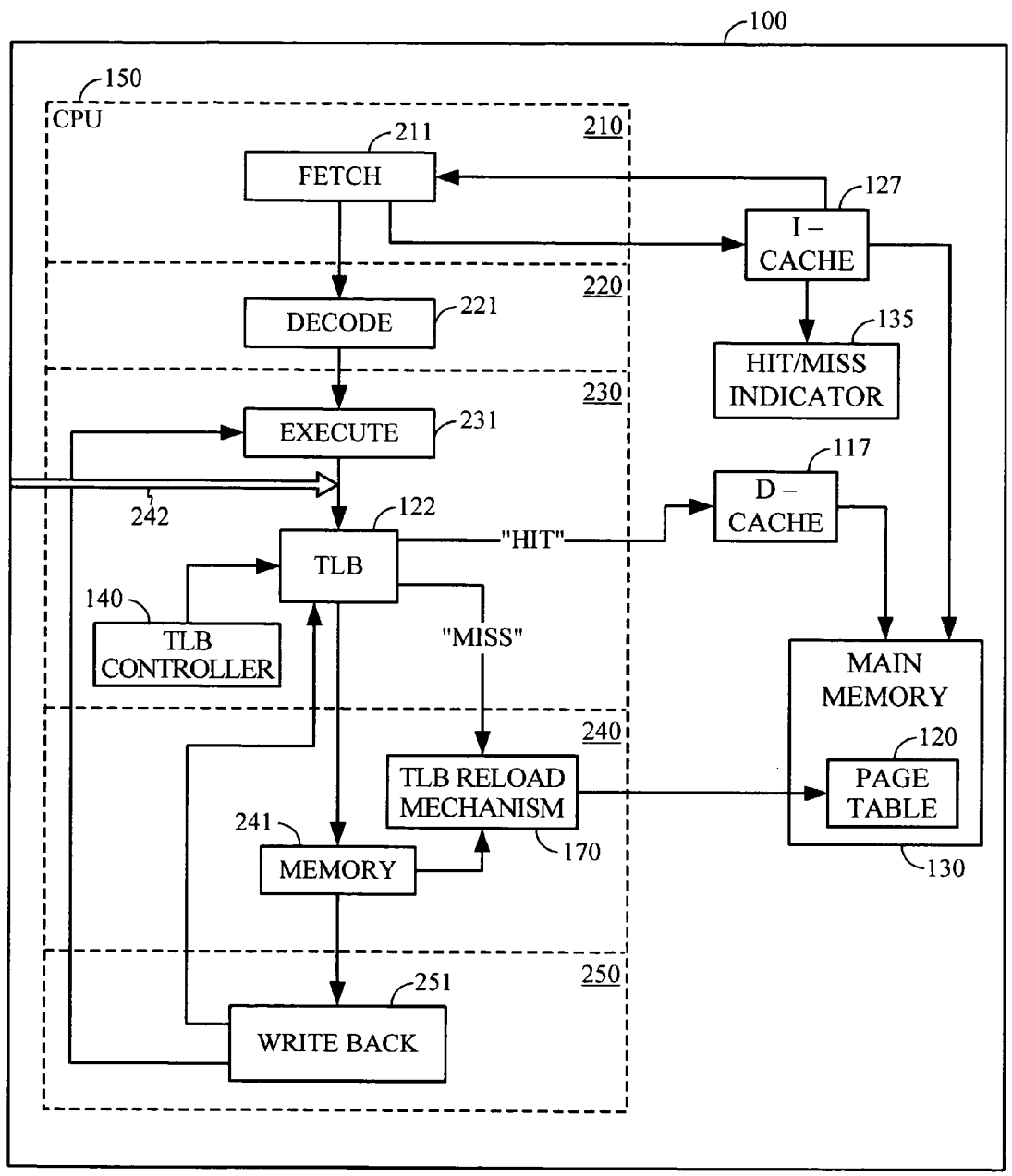
FIG. 2 is a schematic diagram of a pipelined processor having a TLB controller configured to initiate a TLB reload process, without stalling the pipeline, in response to a TLB miss signal.

FIG. 2 is a schematic diagram of a pipelined processor 100 configured to respond to a TLB miss signal by initiating a TLB reload, without immediately stalling the pipeline. In overview, the processor 100 may include a memory 130 configured to store instructions and data in a plurality of pages; a data cache (D-cache) 117 and an instruction cache (I-cache) 127 configured to provide high speed access to a subset of the data and the instructions stored in the main memory 130; a TLB 122 configured to store recent translations from virtual addresses into physical addresses; and a TLB controller 140 configured to control the operation of the TLB 122.

The TLB controller 140 may be part of a central processing unit (CPU) 150 in the processor 100, as shown in FIG. 2. In other embodiments, the TLB controller 140 may be located near the CPU 150 of the processor 100. In the illustrated embodiment of the processor 100, the TLB 122 is also part of the CPU 150. In other embodiments, the TLB 122 may be located near the CPU of a processor, but not within the CPU. For example, the TLB 122 may be located within a memory management unit (not shown) located outside of the CPU. The memory 130 may include a page table 120 that stores the physical page addresses corresponding to the virtual page addresses generated by the processor 100. The TLB may be a data-TLB (DTLB) and/or an instruction-TLB (ITLB) and/or a unified TLB (UTLB).

The processor 100 may further include a TLB reload mechanism 170 configured to implement a TLB reload, if the desired address translation mechanism is missing in the TLB 122, in order to determine the correct address translation information. The TLB reload mechanism 170 may implement a memory access to retrieve address translation information from the page table 120 in the memory 130, for example using a logical state machine (not shown) to perform the hardware page table walk. In some embodiments (not shown), the processor 100 may include one or more higher level TLBs. In these cases, if a given access results in a "miss" in the TLB 122, the TLB reload mechanism 170 may access the higher level TLBs first, before accessing the memory 130.

The processor 100 is a multistage pipelined processor, and an exemplary sequence of pipeline stages within the CPU 150 is conceptually illustrated in FIG. 2, using dashed lines. The sequence of stages illustrated in FIG. 2 include: a fetch stage 210; a decode stage 220; an execute stage 230; a memory access stage 240; and a write back stage 250. The exemplary sequence in FIG. 2 is shown for illustrative purposes. Other alternative sequences, having a smaller or a larger number of pipeline stages, are possible. The function within each stage, e.g., fetching an instruction during the fetch stage 210, decoding the instruction during the decode stage 220, and so forth, typically occur within one CPU clock cycle.

FIG. 2 also illustrates hardware units, each configured to perform the function pertaining to each stage within one CPU clock cycle. The hardware units may include at least one fetch unit 211 configured to fetch one or more instructions from the I-cache 127 or the main memory 130; at least one decode unit 221 configured to decode the instructions fetched by the fetch unit 211; at least one execute unit 231 configured to execute the one or more instructions decoded by the decode unit 221; at least one memory unit 241 configured to perform memory accesses; and at least one write back unit 251 configured to write back into the execute unit 231 the data retrieved from the memory 130. A hit/miss indicator register or buffer 135 may be provided to indicate the hits or misses resulting from the accesses to the I-cache by the instructions fetched by the fetch unit 211.

The pipeline may include a TLB access point 242, functionally illustrated with an arrow 242, at which one or more data access instructions may access the TLB 122 to search for address translation information. If the desired address translation information is present in the TLB 122, the TLB 122 may generate a TLB hit signal. The address translation information may be retrieved from the TLB 122 and sent to the D-cache 117. A data buffer and/or an address buffer (not shown) may be coupled to the D-cache 117, to provide temporary storage for the data and for the address translation information.

The TLB 122 is configured to generate a TLB miss signal, when address translation information for a virtual address of data requested by an instruction presented to the TLB 122 is missing from any of the entries in the TLB 122. The instruction may have been fetched from the I-cache 127, by the fetch unit 211, decoded by the decode unit 221, and may be in the process of being executed by the execute unit 231.

In response to a TLB miss signal, a common practice may have been to stall the pipeline at the point where the miss occurs. The instruction having the virtual address that caused the TLB miss signal may just sit and wait, unable to proceed to the next stage in the pipeline, because of lack of address translation information. While this happens, all stages above the point where the miss has occurred may also have to wait, resulting in considerable inefficiency. Alternatively, the instruction that caused the TLB miss may be flushed, without a stall and refetched. This process may result in multiple misses for the same instruction requiring multiple flushes, which may result in increased latencies and inefficiencies.

In the embodiment of the processor 100 illustrated in FIG. 2, the TLB controller 140 is configured to initiate a TLB reload, in response to a TLB miss signal from the TLB 122, without immediately stalling the pipeline. The TLB reload process is initiated in order to determine the desired address translation information.

The processor 100 flushes and refetches the missing instruction, causing the re-insertion of the instruction that caused the TLB miss at the top of the pipeline (i.e. at the initial stage 210 in FIG. 2). The initiation of the TLB reload, and the flush/refetch of the missing instruction are performed substantially in parallel, and without immediately stalling the pipeline. Instead of stalling the pipeline to wait for the TLB reload process to be completed, the processor 100 flushes the instruction, to let flow what can flow, then refetches the instruction. The instruction that caused the original TLB miss signal thus passes through the successive stages of the pipeline, for a second time around and will hold at a pipeline stage above the TLB access point until the TLB reload process is complete.

The processor 100 is further configured to hold the refetched instruction at a point in the pipeline above the TLB access point 242, until the TLB reload is completed. By the time the instruction arrives at the point above the TLB access point 242, the number and duration of pipeline stalls may have been significantly reduced.

During the TLB reload process, the TLB reload mechanism 170 may access the memory 130, retrieve from the page table 120 in the memory 130 the address translation information for the virtual address of the instruction that caused the TLB miss, and write the retrieved address translation information into the TLB 122. In an embodiment of the processor in which one or more higher-level TLBs (not shown) are provided, the TLB reload mechanism 170 may first access the higher-level TLBs (starting from the lowest level TLB, and progressing onto successively increasing levels of TLBs), before accessing the physical memory 130.

Once the TLB reload mechanism is completed, the processor 100 releases the refetched instruction which will have been holding at a pipeline stage above the TLB access point. Since the address translation information, retrieved from the memory 130, by now has been written into the TLB 122, the TLB 122 now contains the desired address translation information for the virtual address of the refetched instruction. Accordingly, the next time the instruction (that originally caused the TLB miss) is presented to the TLB 122, a TLB hit would occur, instead of a TLB miss. The refetched instruction thus may not generate a TLB miss, the second time around.

The processor 100 may be configured to re-insert the instruction (that caused the initial TLB miss) at the top of the pipeline for a predetermined number of times, and no more. In one embodiment of the processor 100, the predetermined number of times may be one.

Figure 3:
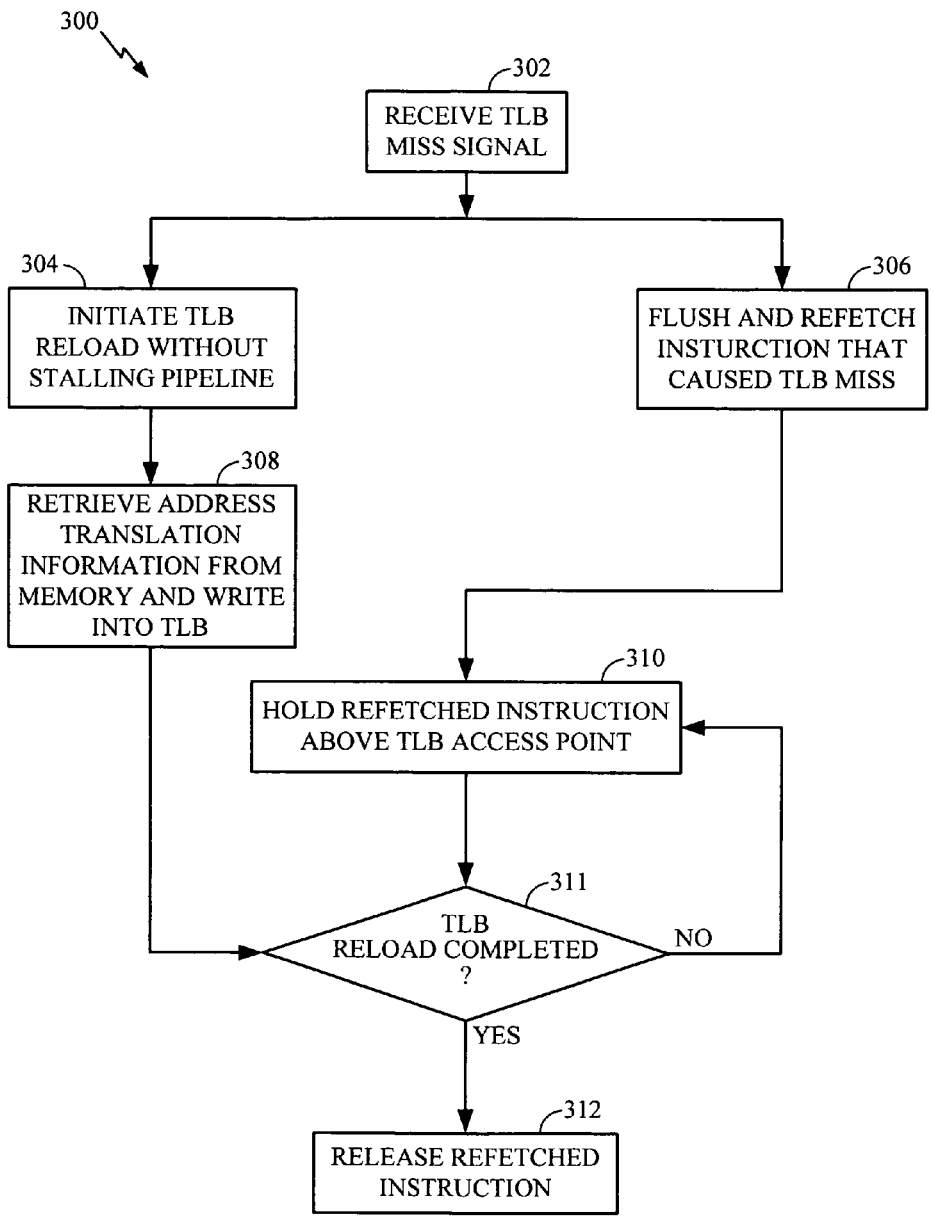
FIG. 3 is a flow diagram of a method of responding to a TLB miss.

FIG. 3 is a flow diagram of a method 300 of responding to a TLB miss. In step 302, a TLB miss signal is received, in response to an instruction that accessed the TLB to look up address translation information for the virtual address of the instruction. The TLB miss signal may be received for example by a TLB controller in or near the CPU of a processor, or by some other control register in the CPU. The TLB miss signal indicates the absence in the TLB 122 of the desired address translation information for the virtual address of the instruction.

In step 304, a TLB reload is initiated, by requesting address translation information to either memory or to a higher level TLB, without immediately stalling the pipeline. In step 306, the instruction that caused the TLB miss signal is flushed and refetched, substantially in parallel with the TLB reload process. In step 308, the desired address translation information for the virtual address is retrieved from the memory or from a higher level TLB, and the retrieved address translation information is written into the TLB. In steps 310 and 311, the refetched instruction is held at a point in the pipeline above the TLB access point, until the TLB reload process is completed. Finally, in step 312 the refetched instruction is released, once the TLB reload process is completed. Because the desired address translation information has been written in the TLB in step 306, a TLB miss no longer occurs.

In sum, an apparatus and method have been described for responding to a TLB miss without immediately stalling the pipeline. A TLB reload is initiated without immediately stalling the pipeline, in response to a TLB miss, and a flush and refetch of the instruction that caused the TLB miss are performed in parallel to the TLB reload process. The refetched instruction is held at a point in the pipeline above the TLB access point, until the TLB reload process is completed. Because the requisite address translation information for the instruction has been written into the TLB during the TLB reload, the refetched instruction can be released and no longer causes a TLB miss.

The previous description of the disclosed embodiments is provided to enable any person skilled in the art to make or use the system described above. Various modifications to these embodiments will be readily apparent to those skilled in the art, and the generic principles defined herein may be applied to other embodiments without departing from the spirit or scope of the inventive concepts disclosed herein. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A processor comprising:
    a translation lookaside buffer (TLB) configured to store address translation information that allows virtual addresses to be translated into physical addresses, the TLB further configured to generate a TLB miss signal when a virtual address of an instruction presented to the TLB is missing from the TLB;
    a multi-stage pipeline including a TLB access point at which one or more instructions is allowed to access the TLB;
    a TLB controller configured to initiate, in response to the TLB miss signal, a TLB reload without immediately stalling the pipeline;
    wherein the processor is configured to flush and refetch the instruction having the missing virtual address; and
    wherein the processor is further configured to hold the refetched instruction at a stage of the pipeline above the TLB access point until the TLB reload is complete.

2. The processor of claim 1, wherein the flush and refetch are performed in parallel with the TLB reload, and wherein the processor is further configured to perform only one flush and refetch of the instruction having the missing virtual address.

3. The processor of claim 1, wherein the processor is further configured to refetch the instruction by re-inserting the instruction at an initial stage of the pipeline.

4. The processor of claim 3, wherein the processor is further configured to re-insert the instruction at the initial stage of the pipeline no more than a predetermined number of times.

5. The processor of claim 1, further comprising a memory configured to store data in a plurality of pages.

6. The processor of claim 5, further comprising a data cache configured to store a subset of the data.

7. The processor of claim 5, wherein the memory is further configured to store a plurality of instructions.

8. The processor of claim 7, further comprising an instruction cache configured to store a subset of the instructions.

9. The processor of claim 5, wherein the TLB controller is further configured to retrieve the address translation information for the missing virtual address from the memory during the TLB reload and to write the address translation information into the TLB.

10. The processor of claim 9, further comprising:
    at least one fetch unit configured to fetch one or more instructions from an instruction register;
    at least one decode unit configured to decode the one or more instructions fetched by the fetch unit; and
    at least one execute unit configured to execute the one or more instructions decoded by the decode unit.

11. The processor of claim 5, wherein each one of the plurality of pages has a physical page address, and wherein the address translation information contained in the TLB allows the virtual addresses to be translated into physical page addresses of the plurality of pages.

12. The processor of claim 1, wherein the TLB comprises at least one of: a data-TLB (DTLB); an instruction-TLB (ITLB), and a unified-TLB (UTLB).

13. The processor of claim 1, wherein the multi-stage pipeline comprises at least a fetch stage, a decode stage, an execute stage, a memory access stage, and a write-back stage.

14. The processor of claim 1, wherein the processor is configured to execute the refetched instruction after the TLB reload is complete.

15. A method of operating a translation lookaside buffer (TLB) in a pipelined processor having a multi-stage pipeline, the method comprising:
    receiving a TLB miss signal from a TLB, the TLB miss signal indicating an absence in the TLB of address translation information for a virtual address of an instruction;
    in response to the TLB miss signal, initiating a TLB reload without immediately stalling the multi-stage pipeline;
    flushing the instruction;
    refetching the instruction; and
    holding the refetched instruction at a stage of the multi-stage pipeline above a TLB access point in the multi-stage pipeline until the TLB reload is completed.

16. The method of claim 15, wherein only one flush and refetch of the instruction is performed, and wherein the flush and refetch are performed in parallel with the TLB reload.

17. The method of claim 15, wherein refetching the instruction comprises re-inserting the instruction at an initial stage of the multi-stage pipeline.

18. The method of claim 17, wherein re-inserting the instruction at an initial stage of the pipeline comprises re-inserting the instruction at the initial stage of the pipeline no more than a predetermined number of times.

19. The method of claim 15, wherein the processor comprises a memory, and further comprising retrieving the address translation information for the virtual address from the memory during the TLB reload and writing the address translation information into the TLB.

20. The method of claim 15, wherein the processor comprises at least one additional TLB that is a higher-level TLB compared to the TLB from which the TLB miss signal is received, and further comprising retrieving the address translation information for the virtual address from the higher-level TLB during the TLB reload and writing the address translation information into the TLB.

21. The method of claim 15, wherein the multi-stage pipeline comprises at least a fetch stage, a decode stage, an execute stage, a memory access stage, and a write-back stage.

22. The method of claim 15, further comprising:
    executing the refetched instruction after the TLB reload is complete.

* * * * *